United States Patent [19]

McMickle et al.

[11] 4,441,273
[45] Apr. 10, 1984

[54] RESILIENT FERRULE COVER FOR FISHING RODS

[75] Inventors: Robert L. McMickle; James T. Rumbaugh, both of Spirit Lake, Iowa

[73] Assignee: Berkley and Company, Inc., Spirit Lake, Iowa

[21] Appl. No.: 353,513

[22] Filed: Mar. 1, 1982

[51] Int. Cl.³ .............................................. A01K 87/00
[52] U.S. Cl. ..................................... 43/18.1; 403/334; 403/361
[58] Field of Search ................. 43/18.1, 18.5; 403/361, 403/182, 334; 285/332, 399

[56] References Cited

U.S. PATENT DOCUMENTS

| | | | |
|---|---|---|---|
| 3,152,820 | 10/1964 | Giampa et al. | 403/182 |
| 3,406,993 | 10/1968 | Haynes | 403/345 |
| 3,436,857 | 4/1969 | Johnson et al. | 43/18.5 |
| 3,519,294 | 7/1970 | Barnes | 43/18.5 |
| 3,554,590 | 1/1971 | Tarantino | 403/293 |
| 3,609,906 | 10/1971 | Johnson et al. | 43/18.5 |
| 3,613,287 | 10/1971 | Grein | 43/18.5 |
| 3,614,143 | 10/1971 | Stevens | 403/334 |
| 3,830,008 | 8/1974 | Johnson | 43/18.1 |
| 4,083,140 | 4/1978 | van Auken | 43/18.5 |

*Primary Examiner*—Gene P. Crosby
*Attorney, Agent, or Firm*—Kinney, Lange, Braddock, Westman & Fairbairn

[57] ABSTRACT

A resilient ferrule cover for joining tapered tubular sections of a fishing rod wherein the ferrule cover is slid over a male ferrule portion with one end of the ferrule cover abutting a female ferrule while covering an exposed portion of the male ferrule and the other end of the ferrule cover abuts a chamfered transition between the male ferrule and its supporting rod segment. After the ferrule is repeatedly assembled, wear of the parts increases, and the ferrule cover, since it is flexible, rides up over the portion of the rod to which the male ferrule is attached, assuring a continued firm ferrule junction while covering the exposed ferrule portion.

2 Claims, 4 Drawing Figures

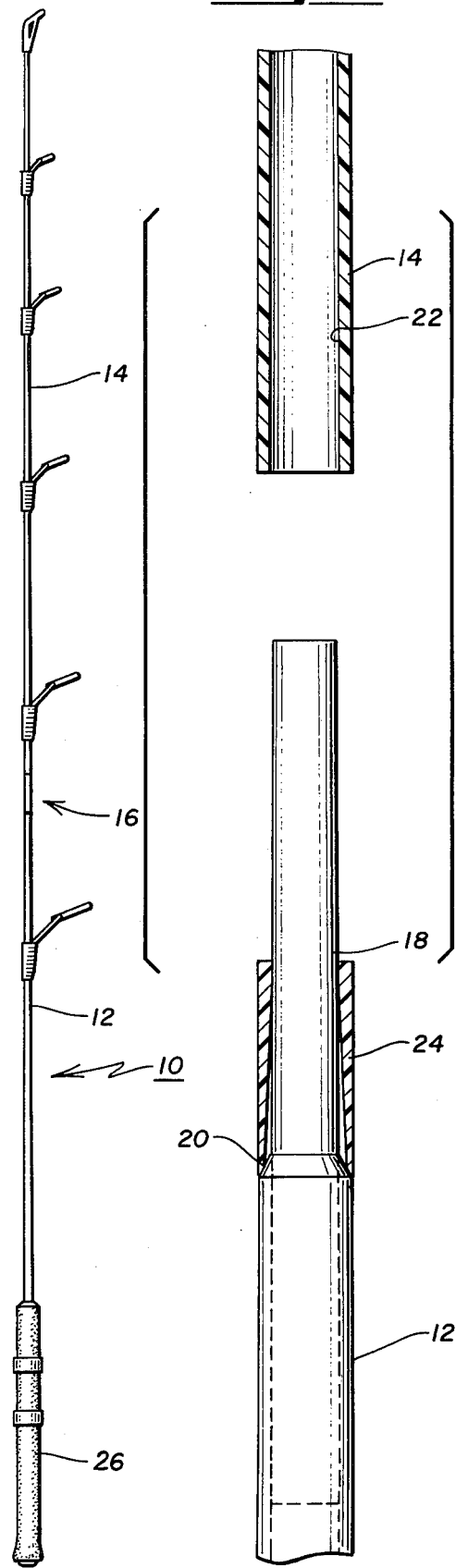
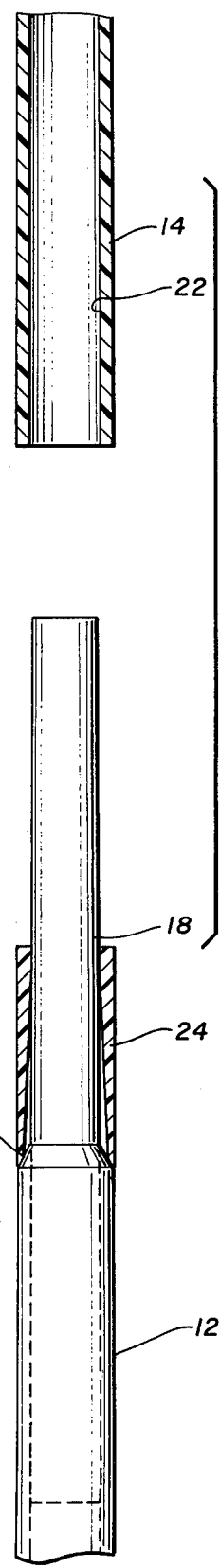
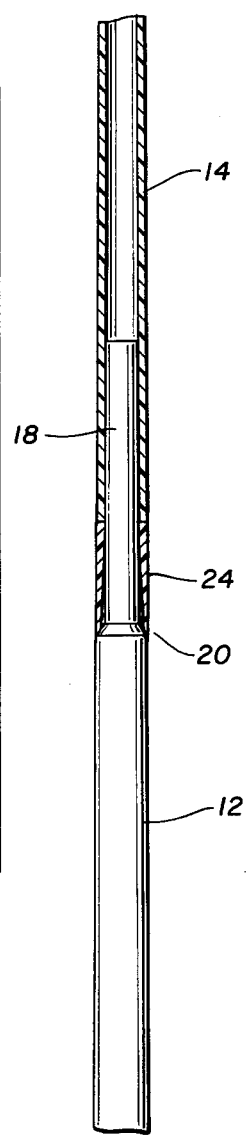
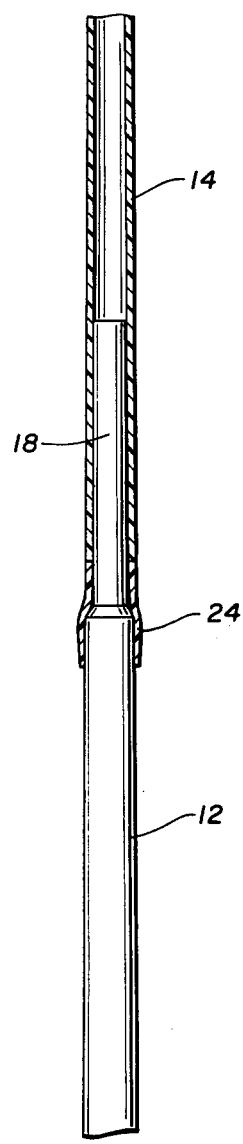

RESILIENT FERRULE COVER FOR FISHING RODS

DESCRIPTION

Background of the Invention

1. Field of the Invention

A cover for protecting the exposed portion of a male ferrule used for connecting adjoining sections of fishing rods and other similar tubular sections, generally.

2. Description of the Prior Art

Rod connecting ferrules are known, but the flexible tapered wall construction of the present ferrule cover is not suggested in the art known to the applicants.

U.S. Pat. No. 3,152,820 relates to a relatively rigid acetal resin ferrule attached to two rod portions which are to be joined. Although the system shown in the patent is indicated as having results superior to the metal ferrules previously in use, no particular provision is shown for providing for continuing good operation of the ferrule as the male and female ferrule portions continue to wear under use.

U.S. Pat. No. 3,406,993 discusses a ferrule which is inserted into the core of the adjoining rod sections which are to be interconnected. The patent addresses the possibility that a long period of use may result in looseness of fit by tapering the male and female ferrule portions. In order to restore the snug fit after continued use, it is necessary to dress the lower end of the female portion of the rod which fits over the inserted ferrule.

U.S. Pat. No. 3,614,143 speaks of another tapered ferrule constructions utilizing a metallic female portion. An O-ring circumferentially surrounds the area near the tip of the male portion to assure continued tight fit, but the entire ferrule unit requires extensive machining and fitting operations.

U.S. Pat. No. 3,609,906 discloses an improvement over the prior art. The male ferrule portion or prong was formed from a compressible resilient material completely inserted in the female portion at the time of manufacture. As wear between the male and female portions occurred, the tight fit was maintained by allowing the male portion to project further into the female portion. U.S. Pat. No. 3,436,857 includes a modification to assure a constant tight fit of the ferrule joint in the event of wear by adding a resilient member to the prong to provide an interference fit.

In order to provide a cover for the unaesthetic exposed portion of the male ferrule, the use of rigid molded fiberglass cylindrical portion bonded to the female portion and having an inside diameter sufficient to cover the exposed portion of the male ferrule and a portion of the adjacent rod is shown in U.S. Pat. No. 3,613,287. The shell had an inside diameter sufficient to permit it to ride up over the rod portion bearing the male ferrule without interference with the tubular rod portion. Although such units work well, they are relatively expensive to manufacture and, because they are rigid, ferrule covers of many different sizes must be manufactured for use in a complete product line of fishing rods.

Another technique utilized in the prior art is the use of O-rings on the exposed male ferrule portion to cover and protect that portion. As wear occurs, the O-rings can be removed one at a time to allow deeper insertion of the male ferrule portion into the female portion. This arrangement is not particularly aesthetic in appearance and requires the user to make the determination that the fit of the two rod portions is too loose and that one of the O-rings ought to be removed. There is no assurance that the condition will be detected by the relatively unsophisticated fisherman.

SUMMARY OF THE INVENTION

The present ferrule cover comprises a flexible polymer sleeve having a uniform outer diameter and a tapered wall thickness. The end of the ferrule cover having the relatively thin wall is oriented to face the segment of the rod in which the male ferrule portion is mounted. The ferrule cover protects the exposed portion of the male ferrule when the rod is assembled and, because the cover is flexible, the cover is adapted to ride up over the chamfered transition between the portion of the shaft holding the male ferrule when the male portion is inserted more deeply into the female portion as wear of the ferrule occurs.

An object of the invention is to provide a ferrule cover of the character referred to that protects the exposed portion of the male ferrule.

Another object of the invention is to provide a ferrule cover which is characterized by the smooth, aesthetic appearance it gives to a fishing rod assembled with a ferrule joint.

A further object of the invention is to provide a ferrule cover which continues to function satisfactorily despite wear of the ferrule parts.

A yet further object of the invention is to provide an improved and simple ferrule cover which is easily manufactured and installed and fits a plurality of fishing rod sizes.

In the drawings, like reference characters designate similar parts in the several views.

BRIEF DESCRIPTION OF THE DRAWINGS

FIG. 1 is a left side elevation view of a multiple piece fishing rod joined using a ferrule cover according to the present invention;

FIG. 2 is a side elevation view of the upper part of the fishing rod shown in FIG. 1, showing the ferrule rod joint slightly separated and in an enlarged scale;

FIG. 3 is a side elevation view of the rod parts of FIG. 2 with the rod part joined; and FIG. 4 is a side elevation view of the same joint shown in FIG. 3 after wear of the ferrule joint parts.

DESCRIPTION OF THE PREFERRED EMBODIMENT

Referring now to FIG. 1, a fishing rod 10 is shown in simplified form. The fishing rod can be manufactured in a number of ways. The ferrule cover of the present invention works particularly well in hollow tubular fiberglass fishing rods. The rod 10 is comprised of a first rod portion 12 which is connected to a handle 14 and has a gently tapered cross-section. The other rod portion 14 is also tapered and is joined to the rod portion 12 by a ferrule joint 16, which is shown in detail in FIGS. 2 through 4.

Turning now to FIG. 2, the distal tip of rod portion 12 is shown at the bottom of the Figure. A tapered male ferrule portion or peg 18 is inserted into the hollow central lumen of rod section 12 and adhesively secured using well-known techniques. The extreme distal end 20 of rod portion 12 is tapered or chamfered from the normal circumference of rod portion 12 to the circumference of the male portion or peg 18 for reasons which are discussed below.

The smaller rod segment 14 has an inner bore 22 which is tapered to form a female ferrule portion to accept the male ferrule 18. In order to provide for wear of the inner bore 22 and male ferrule 18 as the rod is repeatedly assembled and disassembled, the diameter of male ferrule 18 and the inner bore 22 of the rod segment 14 are chosen so that a snug fit is obtained when less than the entirety of the male ferrule portion is inserted into the inner bore 22. The entirety of the male ferrule portion 18 is not inserted in order to allow for wear of the male ferrule portion. As wear occurs on the inner bore and male ferrule portion, the male portion is inserted further into the rod section 14. FIG. 3 shows the normal initial insertion of the ferrule 18 into bore 22, and FIG. 4 shows the insertion of the male ferrule 18 into bore 22 after considerable wear of the parts has occurred.

In order to provide a cover for the exposed portion of the male ferrule 18 when the rod is new and to form a protective cover for the joint throughout the life of the fishing rod, a ferrule cover 24 is mounted on the male portion or peg 18 of rod segment 12. In order to provide a smooth, unobtrusive and aesthetic ferrule joint assembly, the inner diameter of the ferrule cover or sleeve 24 is tapered from a smaller diameter at the end which abuts the shell of rod tip portion 14. The remaining portion of the ferrule cover has an inside diameter tapering to an inside circumference as shown in FIG. 2 in relation to the rod segment 12 to which the tapered male ferrule portion 18 is attached. The thickness of the thick end of the ferrule cover 24 is approximately equal to that of the wall at the end of the female ferrule portion of rod segment 14 to form a joint having a uniform diameter. A smooth joint is also present at the other end of ferrule cover 24 where it meets the chamfered edge 20 of rod segment 12. When the rod is initially assembled, the ferrule cover 24 butts against the end of rod segment 12 as shown in FIG. 3. Thus, the ferrule cover 24 protects and covers the exposed portion of the male ferrule 18 after the rod is assembled. As wear occurs and the amount of male ferrule portion exposed diminishes, the flexible ferrule cover 24 rides up and over the tapered portion 20 of rod section 12 and over the tip portion of the rod to continue to protect the ferrule joint and to provide a smooth, aesthetically pleasing cover to the joint.

The ferrule cover 24 is typically manufactured from a polymer, such as vinyl or any similar suitable material which has the desired properties of resilience and flexibility, to permit the ferrule cover to ride up over the taper 20 or chamfered portion of the rod portion 12.

A typical ferrule cover 24 for a rod having a male ferrule diameter between 4.95 and 5.97 millimeters measured at a point 12.7 mm from the intersection of the taper 20 and male ferrule 18 includes an outside diameter for the ferrule cover of 7.87 mm along its entire length, while the inside diameter tapers in a linear fashion from 6.86 mm to 4.95 mm, and the overall length of the ferrule cover is 19.05 mm. The dimensions, of course, vary for varying ferrule sizes. For example, the outside diameter of the ferrule would typically be increased to 8.64 mm and the narrower inside diameter would increase to 5.97 mm for ferrule sizes ranging from 5.97 mm to 7.24 mm. The inside diameter of the other end of this ferrule would be 7.62 mm. For ferrule sizes ranging from 7.24 mm to 8.76 mm, the inside diameter of the ferrule portion abutting the tip portion of the rod is 7.24 mm, while the inside diameter of the portion of the ferrule cover which contacts the male ferrule is 9.70 mm. Thus, it can be seen that the inside diameter of the ferrule cover 24 is normally selected at the lower end of the ferrule size range over which the ferrule cover is intended to be used.

While the foregoing has illustrated and described what is now contemplated to be the best mode of carrying out the invention, the construction is, of course, subject to modification without departing from the spirit and scope of the invention.

Having thus described the invention, what is claimed and desired to be secured by Letters Patent is:

1. A ferrule for connecting two tapered sections of fishing rod comprising:

a male ferrule portion projecting from a chamfered distal tip portion of a first tubular segment, said male ferrule having a diameter substantially less than the diameter of said first tubular segment and gently tapered to a reduced diameter at its distal end;

a second tubular segment having a tapered inner core constructed and arranged to receive a portion of said male ferrule therein with the remaining portion being exposed; and a ferrule cover having an outside diameter substantially equal to the outside diameter of said second tubular segment and having an inside diameter at one end substantially equal to the inside diameter of said second tubular segment and tapered to a larger diameter at the other end thereof, said ferrule cover constructed from a resilient flexible material to permit the larger diameter portion of said ferrule cover to slide over the exposed portion of said male ferrule portion and abut the chamfered end of the first tubular segment and to slide up the chamfered end of the first tubular segment and over the distal end of said first tubular segment as increased wear between said ferrule and said core reduces the length of the exposed male ferrule portion.

2. The ferrule of claim 1 wherein said ferrule cover is a resilient, flexible vinyl.

* * * * *